United States Patent
Suzuki et al.

(10) Patent No.: US 12,068,487 B2
(45) Date of Patent: Aug. 20, 2024

(54) CATHODE CATALYST LAYER FOR FUEL CELL AND FUEL CELL

(71) Applicant: Panasonic Intellectual Property Management Co., Ltd., Osaka (JP)

(72) Inventors: Hiroaki Suzuki, Osaka (JP); Kazuya Yamasaki, Kyoto (JP); Hitoshi Ishimoto, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 438 days.

(21) Appl. No.: 17/436,577

(22) PCT Filed: Feb. 26, 2020

(86) PCT No.: PCT/JP2020/007838
§ 371 (c)(1),
(2) Date: Sep. 3, 2021

(87) PCT Pub. No.: WO2020/179583
PCT Pub. Date: Sep. 10, 2020

(65) Prior Publication Data
US 2022/0149388 A1 May 12, 2022

(30) Foreign Application Priority Data
Mar. 5, 2019 (JP) .................. 2019-039712

(51) Int. Cl.
*H01M 4/92* (2006.01)
*H01M 8/10* (2016.01)
*H01M 8/1004* (2016.01)

(52) U.S. Cl.
CPC ......... *H01M 4/926* (2013.01); *H01M 8/1004* (2013.01); *H01M 2008/1095* (2013.01)

(58) Field of Classification Search
CPC .............. H01M 4/926; H01M 8/1004; H01M 2008/1095; H01M 2004/8689; H01M 4/8673; H01M 4/8657; Y02E 60/50
See application file for complete search history.

(56) References Cited

U.S. PATENT DOCUMENTS

| 2005/0181270 A1 | 8/2005 | Sugiura |
| 2010/0075190 A1 | 3/2010 | Uehara |

(Continued)

FOREIGN PATENT DOCUMENTS

| CN | 108461788 A | 8/2018 |
| JP | 2004-111191 A | 4/2004 |

(Continued)

OTHER PUBLICATIONS

International Search Report issued in corresponding International Patent Application No. PCT/JP2020/007838, dated May 26, 2020, with English translation.

(Continued)

*Primary Examiner* — Helen Oi K Conley
(74) *Attorney, Agent, or Firm* — Rimon P.C.

(57) ABSTRACT

A cathode catalyst layer has two layers: a first catalyst layer on a gas diffusion layer side, and a second catalyst layer on an electrolyte membrane side. The first catalyst layer includes a first particulate conductive member, first catalyst particles, and a first fibrous conductive member, at least part of the first catalyst particles being supported on the first particulate conductive member. The second catalyst layer includes a second particulate conductive member and second catalyst particles, at least part of the second catalyst particles being supported on the second particulate conductive member. A catalyst support density $D_2$ of the second catalyst particles on the second particulate conductive mem- (Continued)

ber is greater than a catalyst support density $D_1$ of the first catalyst particles on the first particulate conductive member.

4 Claims, 2 Drawing Sheets

(56) References Cited

U.S. PATENT DOCUMENTS

| | | |
|---|---|---|
| 2012/0301809 A1 | 11/2012 | Mitsuta et al. |
| 2012/0318896 A1 | 12/2012 | Ueda et al. |
| 2015/0044593 A1 | 2/2015 | Tanuma et al. |

FOREIGN PATENT DOCUMENTS

| | | |
|---|---|---|
| JP | 2005-259650 A | 9/2005 |
| JP | 2006-134629 A | 5/2006 |
| JP | 2006-173028 A | 6/2006 |
| JP | 2007-242535 A | 9/2007 |
| JP | 2008-60002 A | 3/2008 |
| JP | 2009-199915 A | 9/2009 |
| JP | 2010-73419 A | 4/2010 |
| JP | 2010-80085 A | 4/2010 |
| JP | 2011-198501 A | 10/2011 |
| JP | 2014-225424 A | 12/2014 |
| WO | 2011/096355 A1 | 8/2011 |

OTHER PUBLICATIONS

Chinese Office Action dated May 20, 2024 issued in the corresponding Chinese Patent Application No. 202080018396.6, with partial English translation.

CATHODE CATALYST LAYER FOR FUEL CELL AND FUEL CELL

CROSS-REFERENCE TO RELATED APPLICATIONS

This application is the U.S. National Phase under 35 U.S.C. § 371 of International Application No. PCT/JP2020/007838, filed on Feb. 26, 2020, which claims the benefit of Japanese Application No. 2019-039712, filed on Mar. 5, 2019, the entire contents of each are hereby incorporated by reference.

TECHNICAL FIELD

The present disclosure relates to a cathode catalyst layer for a fuel cell, and a fuel cell.

BACKGROUND ART

A fuel cell includes a membrane-electrode assembly having an electrolyte membrane and a pair of electrodes sandwiching the electrolyte membrane. The pair of electrodes each include a catalyst layer and a gas diffusion layer, in this order from the electrolyte membrane side.

With regard to a catalyst layer on the cathode side, Patent Literature 1 discloses configuring the catalyst layer in a two-layered structure including a first layer on the electrolyte membrane side and a second layer on the gas diffusion layer side, in which the density of the catalyst supported on the catalyst support in the first layer is set three to six times higher than that in the second layer.

When a proton conductive polymer electrolyte membrane is used as the electrolyte membrane, water is required to increase the proton conductivity of the polymer electrolyte membrane. Therefore, a fuel gas or an oxidizing gas is usually humidified before fed to the catalyst layer. In this case, a unit for generating water vapor to humidify the fuel gas or the oxidizing gas (i.e., humidifier) is usually installed, separately from a fuel cell stack.

On the other hand, the fuel cell is desired to be used even in an environment where enough space is not available for installing a humidifier. The reduction in size of the humidifier is also desired. Under such circumstances, much expectation is placed on a fuel cell that exhibits excellent output performance when operated with low humidified feed gases (e.g., relative humidity: 20% to 40%).

CITATION LIST

Patent Literature

[PTL 1] Japanese Laid-Open Patent Publication No. 2010-73419

SUMMARY OF INVENTION

Technical Problem

In the case where a cathode catalyst layer is configured in a two-layered structure having different catalyst support densities as in Patent Document 1, however, simply raising the catalyst support density on the electrolyte membrane side may result in an increase of the catalyst particle diameter due to an increase in the catalyst support density, and the reaction area decreases in some cases.

On the other hand, when the catalyst support density on the gas diffusion layer side is reduced, it is necessary to increase the thickness of the catalyst layer in order to obtain the equivalent catalytic reaction. For example, when the catalyst support density is reduced to about one third, it is necessary to make the catalyst layer about three times thicker so that the catalyst support amount can be kept the same. As a result, the proton migration resistance increases in some cases.

Solution to Problem

One aspect of the present disclosure relates to a cathode catalyst layer for a fuel cell, including: a first catalyst layer including a first particulate conductive member, first catalyst particles, and a first fibrous conductive member, at least part of the first catalyst particles being supported on the first particulate conductive member; and a second catalyst layer including a second particulate conductive member and second catalyst particles, at least part of the second catalyst particles being supported on the second particulate conductive member, wherein a second catalyst support density $D_2$ representing a ratio of a mass of the second catalyst particles supported on the second particulate conductive member to a total mass of the second particulate conductive member and the second catalyst particles supported on the second particulate conductive member is greater than a first catalyst support density $D_1$ representing a ratio of a mass of the first catalyst particles supported on the first particulate conductive member to a total mass of the first particulate conductive member and the first catalyst particles supported on the first particulate conductive member.

Another aspect of the present disclosure relates to a fuel cell, including: a cathode having the aforementioned cathode catalyst layer; an anode; and an electrolyte membrane sandwiched between the cathode and the anode, wherein the second catalyst layer is interposed between the first catalyst layer and the electrolyte membrane.

Advantageous Effects of Invention

According to the present disclosure, the utilization efficiency of the cathode catalyst can be improved, which can enhance the power generation performance of the fuel cell.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF EMBODIMENTS

Figure 1:
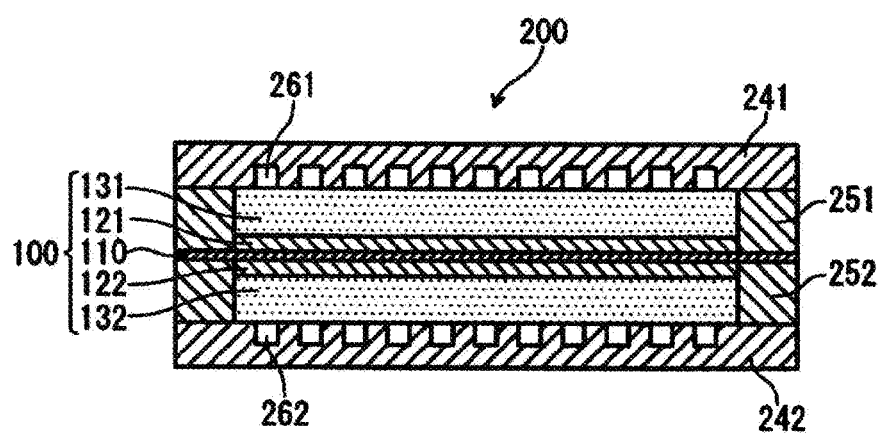
FIG. 1 A schematic cross-sectional view showing a structure of a unit cell of a fuel cell according to an embodiment of the present disclosure.

A cathode catalyst layer for a fuel cell according to an embodiment of the present disclosure has a two-layered structure having a first catalyst layer and a second catalyst layer. The first catalyst layer includes a first particulate conductive member, first catalyst particles, and a first fibrous conductive member, at least part of the first catalyst particles being supported on the first particulate conductive member. The second catalyst layer includes a second particulate conductive member and second catalyst particles, at least part of the second catalyst particles being supported on the second particulate conductive member. In the case of constituting a fuel cell, the electrolyte membrane and the cathode catalyst layer are stacked such that the second catalyst layer of the cathode catalyst layer is situated on the electrolyte membrane side. On the cathode catalyst layer, a gas diffusion layer may be stacked on the first catalyst layer side.

Here, a ratio of a mass of the first catalyst particles supported on the first particulate conductive member to a total mass of the first particulate conductive member and the first catalyst particles supported on the first particulate conductive member is referred to as a first catalyst support density $D_1$. A ratio of a mass of the second catalyst particles supported on the second particulate conductive member to a total mass of the second particulate conductive member and the second catalyst particles supported on the second particulate conductive member is referred to as a second catalyst support density $D_2$. The second catalyst support density is greater than the first catalyst support density ($D_1 < D_2$).

During the power generation of a fuel cell, protons (hydrogen ions) react with oxide ions in the cathode catalyst layer, to produce water. The oxide ions are generated through a catalytic reaction aided by the catalyst disposed within the cathode catalyst layer, from an oxidizing gas (e.g., air) supplied from the first catalyst layer side. On the other hand, the protons are generated at the anode and diffuse via the electrolyte membrane into the cathode catalyst layer. Therefore, in the cathode catalyst layer, the proton concentration tends to be higher on the side close to the electrolyte membrane than on the side away from the electrolyte membrane, and the catalytic reaction tends to be concentrated on the side close to the electrolyte membrane.

In light of the above, by setting the catalyst support density $D_2$ in the second catalyst layer disposed on the electrolyte membrane side greater than the catalyst support density $D_1$ in the first catalyst layer, the catalyst utilization efficiency can be enhanced.

Especially under low-humidified power generation conditions, since the proton conductivity is reduced, the protons can hardly diffuse to a region away from the electrolyte membrane within the cathode catalyst layer, and the distribution of the proton concentration tends to be severely uneven in the thickness direction of the cathode catalyst layer. Therefore, the catalytic reaction tends to be much more concentrated on the side close to the electrolyte membrane. Under low humidified conditions, for example, given that the thickness of the cathode catalyst layer is denoted by T, it may occur that three-fourths of the total power generation current is generated in a T/4 thickness region on the electrolyte membrane side of the cathode catalyst layer. According to the configuration of the present disclosure, the performance decline of the fuel cell can be suppressed even under such low humidified conditions.

However, in association with reducing the catalyst support density in the first catalyst layer, the thickness of the first catalyst layer tends to be increased. This may result in a reduced gas diffusivity, and an increased proton migration resistance. In this embodiment, since the first catalyst layer includes the first fibrous conductive member, the gas diffusivity can be enhanced, and the increase in the proton migration resistance can be suppressed. Furthermore, the water produced during power generation can be easily removed.

In the first catalyst layer, the first catalyst particles may be supported on the first fibrous conductive member. However, the lower the catalyst support density on the first fibrous conductive member is, the higher the water repellency of the first fibrous conductive member is. Thus, a lower catalyst support density on the first fibrous conductive member results in better water removal from the first catalyst layer, which can increase the gas diffusivity. Preferably, the first catalyst particles are not substantially supported on the first fibrous conductive member, and are substantially supported only on the first particulate conductive member. Here, when the ratio of the mass of the first catalyst particles supported on the first fibrous conductive member to the whole mass of the first catalyst particles is 0.5% or less, the first catalyst particles can be regarded as being substantially supported only on the first particulate conductive member.

The second catalyst support density $D_2$ may be equal to or more than 1.2 times the first catalyst support density $D_1$, and may be equal to or more than 1.5 times. When the lower limit of the second catalyst support density $D_2$ is as above, the catalyst utilization efficiency tends to be increased.

The second catalyst support density $D_2$ may be equal to or less than three times the first catalyst support density $D_1$. When the ratio of the second catalyst support density to the first catalyst support density is excessively high, the particle diameter of the second catalyst particles may increase, and the reaction area may decrease. Moreover, the overall thickness of the cathode catalyst layer may increase too much, and the proton migration resistance may increase. By setting the second catalyst support density $D_2$ to be equal to or less than three times the first catalyst support density $D_1$, the increase of the particle diameter of the catalyst particles can be suppressed, and the decrease of the catalytic reaction area can be suppressed. In addition, the overall thickness of the cathode catalyst layer can become adequate, and the increase in the proton migration resistance can be suppressed. The second catalyst support density $D_2$ may be equal to or less than twice the first catalyst support density $D_1$.

The second catalyst support density $D_2$ is, for example, 20% to 60%. By setting the second catalyst support density $D_2$ to 20% or more, a large reaction area can be obtained. On the other hand, by setting the second catalyst support density $D_2$ to at most 60%, the increase in the particle diameter of the catalyst particles can be suppressed, and the decrease of the reaction area can be suppressed. The second catalyst support density $D_2$ may be 30% to 60%, or 30% or 50%.

In contrast, the first catalyst support density $D_1$ is, for example, 5% to 40%. The first catalyst support density $D_1$ may be 10% to 40%, or 10% to 30%.

In view of improving the reactivity of the catalyst layer, the first and second catalyst layers preferably further contain a proton conductive resin. In this case, the proton conductive resin covers at least part of the particulate conductive member (first and second particulate conductive members), the fibrous conductive member (first fibrous conductive member), and/or the catalyst particles (first and second catalyst particles).

Likewise in the first catalyst layer, a fibrous conductive member (second fibrous conductive member) may be included in the second catalyst layer. However, when the second catalyst layer includes a second fibrous conductive member, a ratio $F_2$ of a mass of the second fibrous conductive member to a total mass of the second particulate conductive member and the second fibrous conductive member may be smaller than a ratio $F_1$ of a mass of the first fibrous conductive member to a total mass of the first particulate conductive member and the first fibrous conductive member in the first catalyst layer. The second catalyst layer preferably includes substantially no second fibrous conductive member. In this case, the second catalyst layer serves as a buffer layer, suppressing the damage to the electrolyte membrane caused by the first fibrous conductive member piercing into the electrolyte membrane, and thus can prevent gas from leaking from the damaged portion.

The ratio $F_2$ may be, for example, 20% or less, and may be 10% or less. When the ratio $F_2$ is 0.5% or less, the second catalyst layer can be regarded as including substantially no second fibrous conductive member.

In contrast, the ratio $F_1$ is, for example, 20% or more, and may be 30% or more, or 45% or more. The ratio $F_1$ may be, for example, 80% or less, and may be 65% or more. The above lower and upper limits of $F_1$ can be combined in any combination.

A description will be given below of the component elements of the cathode catalyst layer.

(Particulate Conductive Member)

The first particulate conductive member and the second particulate conductive member are not limited, but are preferably carbon black because of its excellent electrical conductivity. Examples of the carbon black include acetylene black, Ketjen black, thermal black, furnace black, and channel black. The particle diameter thereof (or the length of a structure composed of connected primary particles) is not limited, and any diameter of electrically conductive material as conventionally used for the catalyst layer of fuel cells may be adopted.

(Fibrous Conductive Member)

The first fibrous conductive member and the second fibrous conductive member may be, for example, a fibrous carbon material, such as vapor growth carbon fibers (VGCF (registered trademark)), carbon nanotubes, and carbon nanofibers. The diameter $D_F$ of the fibrous conductive member is not limited, but is preferably 200 nm or less, more preferably 5 nm or more and 200 nm or less, and more preferably 10 nm or more and 170 nm or less. In this case, the gas passage can be sufficiently secured while reducing the volume ratio of the fibrous conductive member in the catalyst layer, and the gas diffusivity can be enhanced. The diameter $D_F$ of the fibrous conductive member can be determined by taking out 10 random fibers of the fibrous conductive member from the catalyst layer and averaging these diameters. The diameter is a length perpendicular to the longitudinal direction of the fibrous conductive member.

The length $L_F$ of the fibrous conductive member is also not limited, but is preferably 0.2 µm or more and 20 µm or less, more preferably 0.2 µm or more and 10 µm or less. In this case, at least some fibers of the fibrous conductive member are oriented along the thickness direction of the catalyst layer, making it easy to ensure gas diffusion passage. The length $L_F$ of the fibrous conductive member is an average fiber length, which can be determined by taking out 10 random fibers of the fibrous conductive member from the catalyst layer and averaging the fiber lengths of the fibrous conductive member. Here, the fiber length of the fibrous conductive member means, when the fibrous conductive member is substantially linear in shape, a length of a straight line connecting one end of the fibrous conductive member to the other end thereof. The aspect ratio $L_F/D_F$ of the fibrous conductive member is not limited, but is preferably 10 or more and 500 or less, more preferably 20 or more and 250 less.

The fibrous conductive member may have an empty space (hollow portion) in its inside. In this case, in the catalyst layer, the fibrous conductive member may be open at both ends in the longitudinal direction. Here, that the fibrous conductive member is open at both ends in the longitudinal direction means that the hollow portion is in communication with the outside via the open ends. In other words, the openings at both ends of the fibrous conductive member are not closed by the electrolyte membrane or the gas diffusion layer, and gas can enter and exit through the both ends.

The fibrous conductive member having the hollow portion may have a through-hole in its sidewall, the through-hole for allowing communication between the hollow portion and the outside. The catalyst particles can be disposed and immobilized on the sidewall of the fibrous conductive member so as to close at least part of the through-hole. The catalyst particles disposed on the sidewall so as to close at least part of the through-hole can efficiently contact with the reaction gas, and thus, the reaction efficiency of the catalyst layer can be significantly improved.

(Catalyst Particles)

The first catalyst particles and the second catalyst particles are not limited, but may be a catalyst metal, such as an alloy or simple substance, including at least one kind of element selected from Sc, Y, Ti, Zr, V, Nb, Fe, Co, Ni, Ru, Rh, Pd, Pt, Os, Ir, lanthanoid series elements, and actinoid series elements. Examples of the catalyst particles used for the anode include Pt and a Pt—Ru alloy. Examples of the catalyst particles used for the cathode include Pt and a Pt—Co alloy. At least part of the catalyst particles are supported on the particulate conductive member. In view of enhancing the gas reaction efficiency, the catalyst particles may be supported on the particulate conductive member and additionally on the fibrous conductive member.

In view of immobilizing the catalyst particles, the catalyst particles preferably have a diameter X of 1 nm or more and 10 nm or less, more preferably 2 nm or more and 5 nm or less. When X is 1 nm or more, the catalyst particles can sufficiently exert their catalytic effect. When X is 10 nm or less, the catalyst particles can be easily supported on the sidewall of the fibrous conductive member.

The diameter X of the catalyst particles can be determined as follows.

With respect to one catalyst particle observed in a TEM image of the catalyst layer, a diameter of a circle having the same cross-sectional area as that of the particle is measured and determined as a diameter of the particle. In this way, with respect to 100 to 300 catalyst particles observed on the TEM image, the diameter of each particle is measured. An average of the particle diameters is calculated as the diameter X of the catalyst particles.

(Proton Conductive Resin)

The proton conductive resin is not limited. Examples thereof include a perfluorocarbon sulfonic acid-series polymer and a hydrocarbon-based polymer. Preferred is a perfluorocarbon sulfonic acid-series polymer because of its excellent heat resistance and chemical stability. The perfluorocarbon sulfonic acid-series polymer is exemplified by Nafion (registered trademark).

The thickness of the catalyst layer is desirably as small as possible, in view of reducing the size of the fuel cell, and maintaining the proton resistance low, thereby to achieve a high output power. On the other hand, in view of the strength, the thickness is preferably not too small. Typically, increasing the blending ratio of the fibrous conductive member tends to increase the thickness of the catalyst layer.

The thickness of the cathode catalyst layer is, for example, 4 μm or more and 15 μm or less. The thickness of the first catalyst layer may be 2 μm or more and 12 μm or less. The thickness of the second catalyst layer may be 1 μm or more and 7 μm or less. The ratio of the thickness of the first catalyst layer to that of the second catalyst layer may be 1 or more and 4 or less, and may be 2 or more and 3 or less. Here, the thickness of the catalyst layer is an average thickness, which can be determined by averaging the distances measured along straight lines drawn from one principal surface to the other principal surface in the thickness direction of the catalyst layer at 10 random points in a cross section of the catalyst layer.

The catalyst layer is prepared, for example, as follows.

First, a particulate conductive member with catalyst particles supported thereon is mixed in a dispersion medium (e.g., water, ethanol, propanol). Next, to the resultant dispersion under stirring, a proton conductive resin and, if necessary, a fibrous carbon material are sequentially added, to obtain a catalyst dispersion. The proton conductive resin may be added dividedly in two or more times. In this case, in the second and subsequent addition, the proton conductive resin may be added together with the fibrous carbon material. Thereafter, the resultant catalyst dispersion is applied onto a surface of the electrolyte membrane or an appropriate transfer base sheet in a uniform thickness, followed by drying. A catalyst layer is thus obtained.

The application can be performed by a conventional application method, for example, spraying, screen printing, and coating using various coaters, such as a blade coater, a knife coater, and a gravure coater. The transfer base sheet is preferably a sheet with smooth surface, such as polyethylene terephthalate (PET) or polypropylene. When a transfer base sheet is used, the obtained catalyst layer is transferred onto an electrolyte film or a gas diffusion layer as described later.

The transfer of the catalyst layer onto the electrolyte membrane or the gas diffusion layer is made by bringing a surface of the catalyst layer, the surface having faced the transfer base sheet, into contact with the electrolyte membrane or the gas diffusion layer. By bringing the smooth surface of the catalyst layer into contact with the electrolyte membrane or the gas diffusion layer, the interface resistance with the catalyst layer is reduced, leading to improved performance of the fuel cell. The catalyst dispersion may be applied directly onto the electrolyte layer.

A fuel cell according to an embodiment of the present disclosure includes a cathode having the above-described cathode catalyst layer, an anode, and an electrolyte membrane sandwiched between the cathode and the anode. The second catalyst layer of the cathode catalyst layer is interposed between the first catalyst layer and the electrolyte membrane.

A description will be given below of an exemplary structure of a fuel cell according to the present embodiment, with reference to FIG. 1. FIG. 1 is a schematic cross-sectional view showing a structure of a unit cell included in a fuel cell according to one embodiment. Usually, a plurality of unit cells are stacked and included as a cell stack in a fuel cell. In FIG. 1, one unit cell is shown for the sake of convenience.

A unit cell 200 includes a membrane-electrode assembly 100 including: an electrolyte membrane 110; a cathode catalyst layer 121 and an anode catalyst layer 122 disposed so as to sandwich the electrolyte membrane 110; and a cathode-side gas diffusion layer 131 and an anode-side gas diffusion layer 132 disposed so as to sandwich the electrolyte membrane 110 via the cathode catalyst layer 121 and the anode catalyst layer 122, respectively. The unit cell 200 further includes a cathode-side separator 241 and an anode-side separator 242 sandwiching the membrane-electrode assembly 100. The electrolyte membrane 110 has a size slightly larger than the cathode catalyst layer 121 and the anode catalyst layer 122, and a peripheral portion of the electrolyte membrane 110 protrudes from the cathode catalyst layer 121 and the anode catalyst layer 122. The peripheral portion of the electrolyte membrane 110 is held between a pair of seal members 251 and 252.

Figure 2:
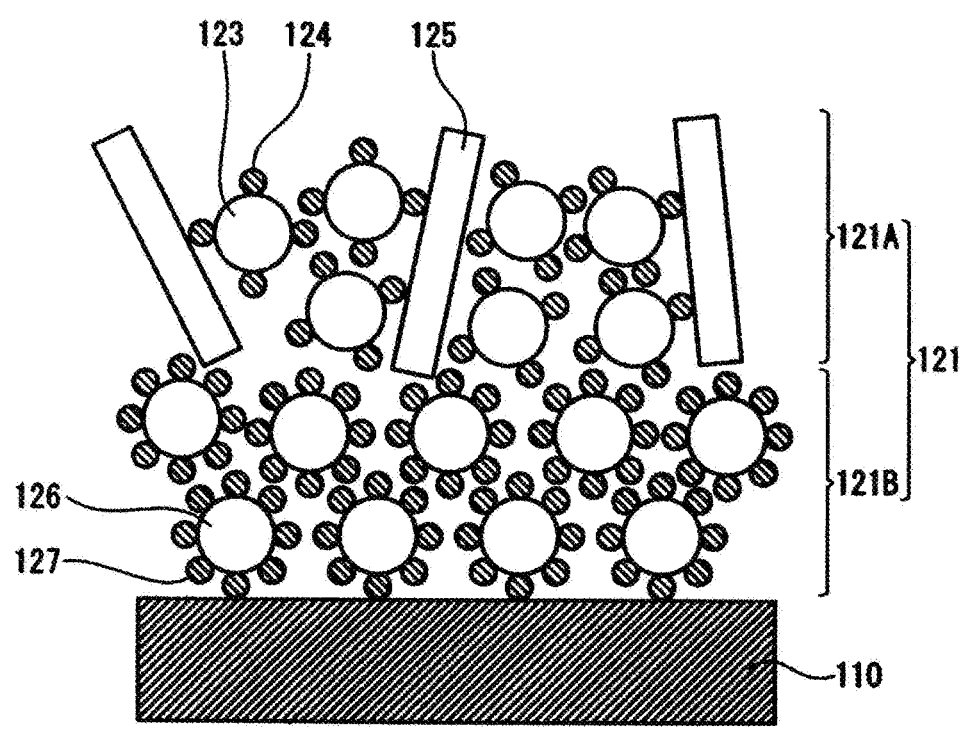
FIG. 2 A schematic diagram showing an interior of a catalyst layer according to an embodiment of the present disclosure.

FIG. 2 is a schematic diagram showing an interior of the cathode catalyst layer 121, in which the cathode catalyst layer interior is viewed laterally. FIG. 2 also shows the electrolyte membrane 110. As illustrated in FIG. 2, the cathode catalyst layer 121 has two layers: a first catalyst layer 121A and a second catalyst layer 121B. The first catalyst layer 121A includes a first particulate conductive member 123, first catalyst particles 124, and a first fibrous conductive member 125. On the other hand, the second catalyst layer 121B includes a second particulate conductive member 126 and second catalyst particles 127, but includes substantially no fibrous conductive member (second fibrous conductive member).

In the first catalyst layer 121A, the first catalyst particles 124 are supported on the first particulate conductive member 123. In the second catalyst layer 121B, the second catalyst particles 127 are supported on the second particulate conductive member 126. The support density of the second catalyst particles 127 on the second particulate conductive member 126 (second catalyst support density) is higher than that of the first catalyst particles 124 on the first particulate conductive member 123 (first catalyst support density). This can enhance the catalyst utilization efficiency.

In the first catalyst layer 121A, part of the first catalyst particles 124 may be supported on the first fibrous conductive member 125. However, in view of enhancing the water removal from the first catalyst layer 121A and improving the gas diffusivity, the amount of the first catalyst particles 124 supported on the first fibrous conductive member 125 may be reduced. More preferably, the first fibrous conductive member 125 supports substantially no first catalyst particle 124.

For the anode catalyst layer 122, any known material and known configuration may be employed. The anode catalyst layer may include, similarly to the cathode catalyst layer, a conductive member, catalyst particles supported on the conductive member, and a proton conductive resin. The conductive member may also include a particulate conductive member and/or a fibrous conductive member.

The anode catalyst layer will not be exposed to an oxidizing environment so strong as that the cathode catalyst layer is exposed to. However, due to lack of the water produced by reaction, the anode catalyst layer tends to be in a less humidified environment than that the cathode catalyst layer is to be. As a result, the proton conductivity tend to be reduced. The composition and the content of each of the particulate conductive member, the fibrous conductive member, and the proton conductive resin may be varied, so that a higher proton conductivity than that of the cathode catalyst layer can be obtained.

(Electrolyte Membrane)

The electrolyte membrane 110 is preferably a polymer electrolyte membrane. Examples of the material of the polymer electrolyte membrane include polymer electrolytes exemplified as the proton-conductive resin. The electrolyte membrane has a thickness of, for example, 5 to 30 μm.

(Gas Diffusion Layer)

The cathode-side gas diffusion layer 131 and the anode-side gas diffusion layer 132 may be either a structure having a substrate layer or a structure not having a substrate layer. The structure having a substrate layer is, for example, a structure body having a substrate layer and a microporous layer provided thereon on the catalyst layer side. The substrate layer may be an electrically conductive porous sheet, such as carbon cloth or carbon paper. The microporous layer may be, for example, a mixture of a water-repellent resin such as fluorocarbon resin, an electrically conductive carbon material, and a proton-conductive resin (polymer electrolyte).

(Separator)

The cathode-side separator 241 and the anode-side separator 242, as long as having airtightness, electron conductivity, and electrochemical stability, may be made of any material. Preferable examples of such materials include a carbon material and a metal material. The metal material may be coated with carbon. The cathode-side separator 241 and the anode-side separator 242 can be obtained by, for example, forming a metal sheet in a predetermined shape, and applying surface treatment thereto.

In the present embodiment, the cathode-side separator 241 is provided with a gas diffusion channel 261, on a surface in contact with the cathode-side gas diffusion layer 131. The anode-side separator 242 is provided with a gas diffusion channel 262, on a surface in contact with the anode-side gas diffusion layer 132. The gas flow channel may be of any shape, and can be formed in a shape of, for example, straight channel, or serpentine channel (Seal Member)

The seal members 251 and 252 are a material having elasticity, and prevent the leakage of fuel and/or oxidant from the gas flow channels 261 and 262. For example, the seal members 251 and 252 each have a frame-like shape continuously surrounding the peripheral edge portion of the cathode and anode catalyst layers 121 and 122. Any known material and any known configuration can be employed for the seal members 251 and 252.

The present disclosure will be more specifically described below with reference to Examples. It is to be noted, however, that the present disclosure is not limited to the following Examples.

Example 1

<Preparation of Dispersion for Cathode Catalyst Layer>

A particulate conductive member (carbon black) supporting catalyst particles (Pt—Co alloy) was added to an appropriate amount of water, and stirred and dispersed. To the resultant dispersion under stirring, an appropriate amount of ethanol was added. Then, per 100 parts by mass of the above particulate conductive member supporting catalyst particles, 35 parts by mass of a fibrous conductive member (vapor-grown carbon fiber, average diameter: 150 nm, average fiber length: 10 μm) and 100 parts by mass of a proton conductive resin (perfluorocarbon sulfonic acid-series polymer) were added, and stirred together, to prepare a catalyst dispersion for a first catalyst layer of a cathode catalyst layer.

A ratio of a mass of the catalyst particles to a total mass of the particulate conductive member and the catalyst particles (first catalyst support density $D_1$) in the catalyst dispersion for a first catalyst layer was set to 30%.

Separately, a particulate conductive member (carbon black) supporting catalyst particles (Pt—Co alloy) was added to an appropriate amount of water, and stirred and dispersed. To the resultant dispersion under stirring, an appropriate amount of ethanol was added. Then, per 100 parts by mass of the above particulate conductive member supporting catalyst particles, 100 parts by mass of a proton conductive resin (perfluorocarbon sulfonic acid-series polymer) were added, and stirred together, to prepare a catalyst dispersion for a second catalyst layer of a cathode catalyst layer.

A ratio of a mass of the catalyst particles to a total mass of the particulate conductive member and the catalyst particles (second catalyst support density $D_2$) in the catalyst dispersion for a second catalyst layer was set to 50%.

<Preparation of Dispersion for Anode Catalyst Layer>

A particulate conductive member (carbon black) supporting catalyst particles (Pt) was added to an appropriate amount of water, and stirred and dispersed. To the resultant dispersion under stirring, an appropriate amount of ethanol was added. Then, per 100 parts by mass of the above particulate conductive member supporting catalyst particles, 35 parts by mass of a fibrous conductive member (vapor-grown carbon fiber, average diameter: 150 nm, average fiber length: 10 μm) and 120 parts by mass of a proton conductive resin (perfluorocarbon sulfonic acid-series polymer) were added, and stirred together, to prepare a catalyst dispersion for an anode catalyst layer.

<Fabrication of Unit Cell>

Using a spray method, the prepared catalyst dispersion for a second cathode catalyst layer was applied in a uniform thickness onto a surface of a 15-μm-thick electrolyte membrane (perfluorocarbon sulfonic acid-series polymer membrane). This was followed by drying, to form a second catalyst layer.

Furthermore, the catalyst dispersion for a first cathode catalyst layer was applied in a uniform thickness onto the second catalyst layer. This was followed by drying, to form a cathode catalyst layer comprising two layers of the first and second catalyst layers.

The film thickness of the cathode catalyst layer was 6 μm, of which the film thickness of the first catalyst layer was 4 μm and the film thickness of the second catalyst layer was 2 μm.

Similarly, using a spray method, the prepared catalyst dispersion for an anode catalyst layer was applied in a uniform thickness onto the other surface of the electrolyte membrane. This was followed by drying, to form an anode catalyst layer. The film thickness of the anode catalyst layer was 4.5 μm.

Next, two porous conductive carbon sheets each serving as a gas diffusion layer were prepared, and one was placed in contact with the anode catalyst layer and the other was placed in contact with the cathode catalyst layer.

Next, frame-like sealing members were respectively disposed so as to surround the anode and the cathode. The resultant whole was held between a pair of stainless-steel plates (separators) each having a gas flow channel in an area to be in contact with the gas diffusion layer, to complete a unit cell A1 for testing.

<Evaluation>

The unit cell A1 of Example 1 was evaluated for its power generation performance Specifically, the unit cell A1 was heated to 80° C., and a fuel gas having a relative humidity of 30% was fed to the anode, and an oxidant gas (air) having a relative humidity of 30% was fed to the cathode. The fuel gas and the oxidant gas were pressurized and fed such that the gas pressure at the cell inlet was 50 kPa to 70 kPa. Then, with the current flow kept at a constant rate using a load controller, the current density per electrode area of the anode and the cathode was varied to measure a voltage (initial voltage) V and an output power density P of the unit cell A1, and a maximum output density $P_{max}$ at which the output density reached a maximum was determined.

Comparative Example 1

In fabricating a unit cell, only the catalyst dispersion for a first cathode catalyst layer as used in Example 1 was applied in a uniform thickness onto a surface of the electrolyte membrane. This was followed by drying, to form a catalyst layer.

The film thickness of the cathode catalyst layer was 8 μm.

A unit cell B1 for testing was completed in the same manner as in Example 1 except the above, and evaluated in the same manner as in Example 1. The amount of the catalyst particles occupying the entire cathode catalyst layer was the same in the cells A1 and B1.

The maximum output density $P_{max}$ of the cell A1 was 171, relative to the maximum output density of the cell B1 which was taken as 100. By forming the cathode catalyst layer in two layers comprising the first catalyst layer on the gas diffusion layer side and the second catalyst layer on the electrolyte membrane side, and setting the catalyst support density in the second catalyst layer higher than that in the first catalyst layer, the power generation performance was dramatically improved.

INDUSTRIAL APPLICABILITY

The fuel cell according to the present disclosure can be suitably used, for example, as a stationary power supply for a household cogeneration system, and a vehicle power supply. The present invention can be suitably applied to a polymer electrolyte fuel cell, but is not limited thereto, and can be applied to fuel cells in general.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

REFERENCE SIGNS LIST

100: membrane-electrode assembly
110: electrolyte membrane
121: cathode catalyst layer
  121A: first catalyst layer
    123: first particulate conductive member
    124: first catalyst particle
    125: first fibrous conductive member
  121B: second catalyst layer
    126: second particulate conductive member
    127: second catalyst particle
122: anode catalyst layer
131: cathode-side gas diffusion layer
132: anode-side gas diffusion layer
200: fuel cell (unit cell)
241: cathode-side separator
242: anode-side separator
251, 252: sealing member
261, 262: gas flow channel

The invention claimed is:

1. A cathode catalyst layer for a fuel cell, comprising:
a first catalyst layer including a first particulate conductive member, first catalyst particles, and a first fibrous conductive member, at least part of the first catalyst particles being supported on the first particulate conductive member; and
a second catalyst layer including a second particulate conductive member and second catalyst particles, at least part of the second catalyst particles being supported on the second particulate conductive member, wherein
a second catalyst support density $D_2$ representing a ratio of a mass of the second catalyst particles supported on the second particulate conductive member to a total mass of the second particulate conductive member and the second catalyst particles supported on the second particulate conductive member is greater than a first catalyst support density $D_1$ representing a ratio of a mass of the first catalyst particles supported on the first particulate conductive member to a total mass of the first particulate conductive member and the first catalyst particles supported on the first particulate conductive member.

2. The cathode catalyst layer according to claim 1, wherein in the first catalyst layer, a ratio of a mass of the first catalyst particles supported on the first fibrous conductive member to a whole mass of the first catalyst particles is 0.5% or less.

3. The cathode catalyst layer according to claim 1, wherein the second catalyst support density is equal to or less than three times the first catalyst support density.

4. A fuel cell, comprising:
a cathode having the cathode catalyst layer of claim 1;
an anode; and
an electrolyte membrane sandwiched between the cathode and the anode, wherein
the second catalyst layer is interposed between the first catalyst layer and the electrolyte membrane.

* * * * *